United States Patent [19]
Sjoberg

[11] Patent Number: 5,662,948
[45] Date of Patent: Sep. 2, 1997

[54] ADJUSTABLE AND REMOVABLE TRIMLINE INSERTS FOR A MOLDING TOOL

[75] Inventor: Roy H. Sjoberg, Bloomfield Hills, Mich.

[73] Assignee: Chrysler Corporation, Auburn Hills, Mich.

[21] Appl. No.: 593,382

[22] Filed: Jan. 29, 1996

[51] Int. Cl.$^6$ .................................................. B29C 43/36
[52] U.S. Cl. .......................... 425/195; 425/394; 425/398; 249/155
[58] Field of Search ................................ 425/423, 408, 425/412, 395, 195, 183, 193, 394, 398; 249/155, 156, 158, 102; 264/220

[56] References Cited

U.S. PATENT DOCUMENTS

| | | | |
|---|---|---|---|
| 3,491,408 | 1/1970 | Natkins | 18/30 |
| 4,473,346 | 9/1984 | Hehl | 425/183 |
| 4,480,976 | 11/1984 | Vaubel et al. | 425/186 |
| 4,500,976 | 2/1985 | Cyriax et al. | 425/1851 |
| 4,717,327 | 1/1988 | Faneuf | 425/190 |
| 5,096,404 | 3/1992 | Janos et al. | 425/190 |
| 5,116,450 | 5/1992 | Spoo et al. | 156/441 |
| 5,151,232 | 9/1992 | Thornthwaite et al. | 264/220 |
| 5,346,171 | 9/1994 | Kephart | 249/155 |
| 5,372,349 | 12/1994 | Elmore | 249/158 |
| 5,387,096 | 2/1995 | Wieser | 425/190 |

*Primary Examiner*—Jay H. Woo
*Assistant Examiner*—Robert Hopkins
*Attorney, Agent, or Firm*—Edward A. Craig

[57] ABSTRACT

A molding tool is provided that has a cavity half and a core half for molding a workpiece. The molding tool has a male trimpiece that is attached to the cavity half of the molding tool via a plurality of securing devices for removal of the male trimpiece when worn. A female trimpiece is attached to the core half of the molding tool via a plurality of securing devices for removal of the female trimpiece when worn. An adjustable stop plate is also provided that is attached to the core half of the molding tool via a plurality of securing devices. The stop plate is disposed around, and is adjacent to, the female trimpiece. The stop plate is vertically adjustable to provide for varying thickness of the workpiece. A trimline retention reservoir is also disposed in the core half of the molding tool between the female trimpiece and the stop plate for receiving the male trimpiece when the molding tool is in the closed position. The thicknesses of each trimpiece can be varied so as to change the size of the workpiece. Moreover, the male trimpiece can be notched so that the workpiece can be made with a protruding flange.

2 Claims, 1 Drawing Sheet

ADJUSTABLE AND REMOVABLE TRIMLINE INSERTS FOR A MOLDING TOOL

BACKGROUND OF THE INVENTION

1. Field of the Invention

In general, the present invention relates to molding tools. More particularly, the present invention relates to adjustable and removable trimline inserts for a "cavity half" and a "core half" of a molding tool.

2. Description of the Related Art

Great steps have been made over the past several years in molding technology. Workpieces for various industries are now formed by injection molding, resin transfer molding (RTM), low pressure molding, SMC, and RIM/SCRIM tools. While the actual workpiece forming technology has made great strides, the precision with which the edges and corners of the molded workpieces are made has been lacking. Laser technology has been used to burn defined edges in newly molded workpieces, but the technology is cost prohibitive and not easily adapted to industrial settings. To save on time, manufacturers have simply replaced the entire molding tool when its shear edges have become worn. Alternatively, manufacturers have welded smooth the workpiece engagement area of the molding tool thereby filling in a trench that is created by repeated contact with the workpiece.

A further limitation in the art of molding technology is that an adjustable stop plate is not provided that can adjust the material thickness of the workpiece from only one side of the molding tool. For example, U.S. Pat. No. 5,387,096 (the '096 patent) to Wieser discloses the use of trim pieces that can adjust the thickness and molded shape of a workpiece. To adjust the shape and thickness, however, requires that the trim pieces be inserted in both the cavity half and the core half of the molding tool. This is highly undesirable in a manufacturing setting which typically has a molding tool that lies flat on a table so that workers have access to only the core half of the tool. Moreover, the '096 patent does not disclose the use of trim pieces for removable shear edges, nor does it disclose altering the width of trimpieces so that part size can be changed.

It is therefore desirable in the art to have a molding tool with shear edges or trimline pieces that are easily removable and replaceable when worn. It is also desirable to have an adjustable stop plate for regulating the material thickness of a workpiece that is accessible from one side of the molding tool.

SUMMARY OF THE INVENTION

The present invention provides a molding tool that has a cavity half and a core half for molding a workpiece. The molding tool has a first trimpiece attached to its cavity half via a plurality of securing devices for removal of the first trimpiece when worn. A second trimpiece is also provided that is attached to the core half of the molding tool via a plurality of securing devices for removal of the second trimpiece when worn.

An adjustable stop plate is attached to the core half of the molding tool via a plurality of securing devices. The adjustable stop plate is disposed around, and is adjacent to, the second trimpiece. Moreover, the stop plate is vertically adjustable to provide for varying thicknesses of the workpiece. The present invention further provides a trimline retention reservoir that is disposed in the core half of the molding tool between the second trimpiece and the stop plate for receiving the first trimpiece when the molding tool is in the closed position. The thickness of the trimpieces can be varied so as to change the size of the workpiece.

Other objects, features and advantages of the present invention will become apparent by reference to the following detailed description when considered in conjunction with the accompanying drawings.

BRIEF DESCRIPTION OF THE DRAWINGS

In the drawings below, reference characters refer to like parts throughout the views, and wherein.

DESCRIPTION OF THE PREFERRED EMBODIMENT(S)

Figure 1:
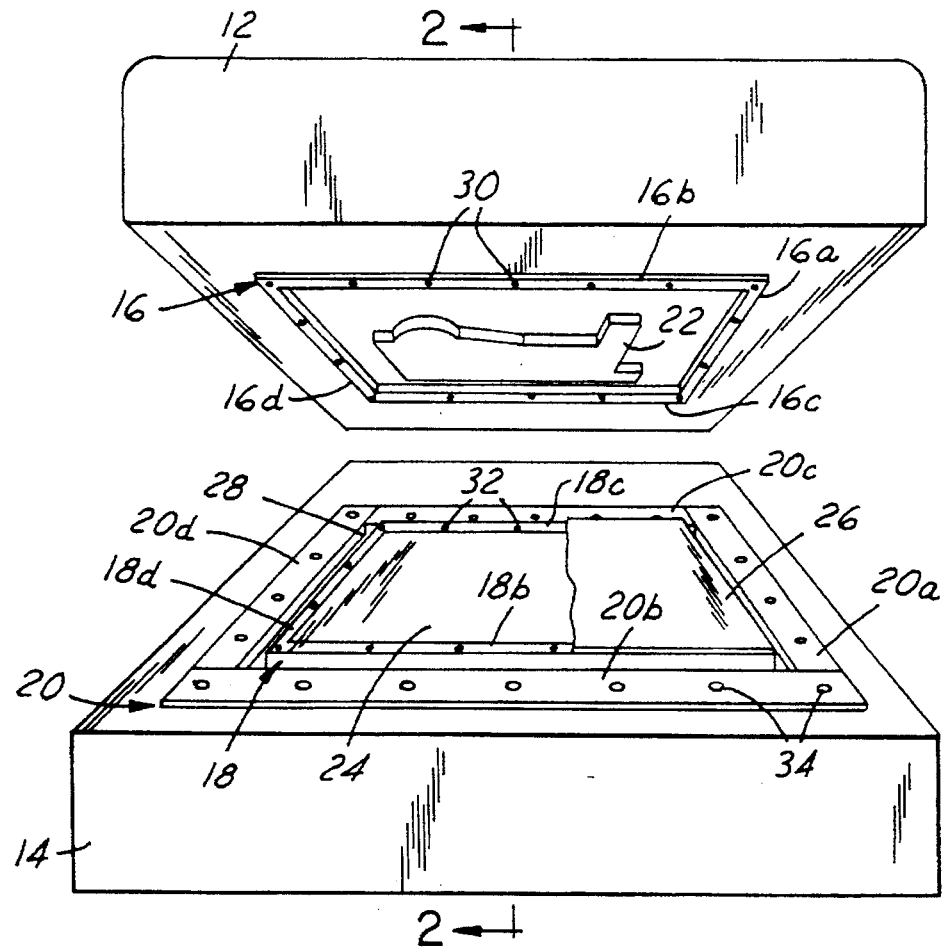
FIG. 1 is a perspective view of a molding tool of the present invention showing a workpiece application.

Commencing with FIG. 1, a molding tool 10 is shown that has a cavity half 12 and a core half 14. Disposed centrally in the cavity half 12 is a part mold 22 for application on a workpiece 26. While the core half 14 has a core cavity 24 disposed centrally therein. The molding tool 10 has an open position and a closed position. The molding tool 10 has a first trimpiece 16 attached to its cavity half 12. In the preferred embodiment the first trimpiece 16 is male trimpiece that is rectangular in shape. The first trimpiece 16 is made up of four trimlines 16a,b,c,d. A second trimpiece 18 is also provided in the present invention that is attached to the core half 14 of the molding tool 10. In the preferred embodiment the second trimpiece 18 is a female trimpiece that is rectangular in shape. The second trimpiece 18 is made up of four trimlines 18a,b,c,d.

Figure 2:
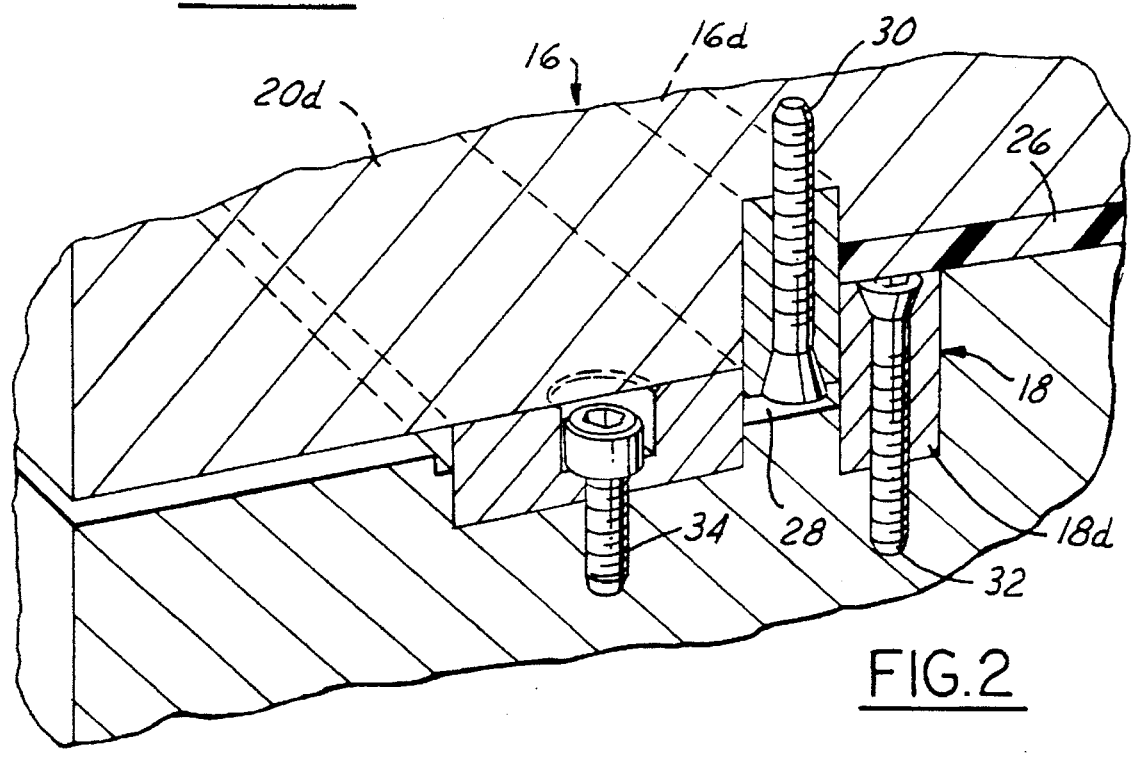
FIG. 2 is a cross sectional view of the molding tool of the present invention taken along sight line 2—2.

As is best seen in FIG. 2, exemplary trimline 16d of first trim piece 16 is attached to the cavity half via a plurality of securing devices 30 for removal of the trimline 16d when worn. Trimline 18d of the second trim piece 18 is attached to the core half 14 via a plurality of securing devices 32 for removal of the trimline 18d when worn. The thickness of the trimpieces 16 and 18 can be varied so as to change the size of a workpiece 26. Moreover, trimpiece 16 can notched so that the workpiece 26 can be made with a protruding flange.

In operation, each time the molding tool 10 is pressed together in the closed position on workpiece 26, the first and second trimline pieces 16 and 18, commonly referred to by those skilled in the art as shear edges, abut against the workpiece 26. After continued use, the first and second trimlines 16 and 18 become worn. Once the trimlines 16a,b,c,d, and 18a,b,c,d of trim pieces 16 and 18 respectively are worn they can be separately or collectively removed from the molding tool 10 by detaching securing devices 30 and 32 and thereby replaced with new trimlines.

As shown in FIG. 1, the present invention further has an adjustable stop plate 20 that is attached to the core half 14 of the molding tool 10 via a plurality of securing devices 34. In the preferred embodiment the securing devices 34 are screws. The adjustable stop plate 20 is disposed around, and is adjacent to, the second trimpiece 18. The adjustable stop plate 20 has four adjuster trimlines 20a,b,c,d that in the preferred embodiment form a rectangle. Moreover, the stop plate 20 is vertically adjustable to provide for varying thicknesses of the workpiece 26. In operation, the height that the adjustable stop plate 20 is raised up from the core half 14 adjusts the closing height of the cavity half 12 so that the thickness of the workpiece 26 is controlled. When worn, the adjustable stop plate 20 can be easily replaced by detaching the securing devices 34.

The present invention further provides a trimline retention reservoir 28 that is disposed in the core half 14 of the molding tool 10 between the second trimpiece 18 and the adjustable stop plate 20 for receiving the first trimpiece 16 when the molding tool 10 is in the closed position.

While the invention has been described in detail, it is to be expressly understood that it will be apparent to persons skilled in the relevant art that the invention may be modified without departing from the spirit of the invention. Various changes of form, design or arrangement may be made to the invention without departing from the spirit and scope of the invention. Therefore, the above mentioned description is to be considered exemplary, rather than limiting, and the true scope of the invention is that defined in the following claims.

What is claimed is:

1. A molding tool having a cavity half and a core half for molding a workpiece, the cavity half and core half having confronting surfaces and the cavity half having a part mold disposed on the confronting surface thereof, the cavity half and the core half being relatively movable toward and away from one another between open and closed positions, a male trimpiece comprising four trimlines arranged end to end in a rectangle and each attached to the confronting surface of the cavity half by screws for individual removal and replacement when worn, a female trimpiece comprising four trimlines arranged end to end in a rectangle and each attached to the confronting surface of the core half by screws for individual removal and replacement when worn, an adjustable stop plate on the confronting surface of the core half extending around the female trimpiece comprising stop plate segments arranged end to end in a rectangle and each removably attached to the core half by screws, each segment being parallel to and spaced laterally outwardly from a respective one of the female trimlines, the stop plate being engageable with the confronting surface of the cavity half to establish the closed position of the molding tool and being vertically adjustable to provide for a desired thickness of the workpiece, and a trimline retention reservoir in the confronting surface of the core half between the female trimpiece and the stop plate for receiving the male trimpiece when the molding tool is in the closed position.

2. A molding tool as defined in claim 1, wherein the female trimpiece and the stop plate have opposing surfaces defining opposite sides of the reservoir, and the male trimpiece when received in the reservoir is trapped between said opposing surfaces.

* * * * *